United States Patent [19]

Stronski

[11] Patent Number: 4,778,322

[45] Date of Patent: Oct. 18, 1988

[54] ROUND BALE RETRIEVER/FEEDER

[76] Inventor: Bill Stronski, Box 1360, Claresholm, Alberta, Canada, T0L 0T0

[21] Appl. No.: 768,267

[22] Filed: Aug. 22, 1985

[51] Int. Cl.$^4$ .................... A01D 90/10; A01D 87/12
[52] U.S. Cl. ................................ 414/24.6; 241/101.7; 414/518
[58] Field of Search ............... 414/24.5, 24.6, 518, 414/528, 529; 241/101 A, 101.7; 239/672, 677, 679; 198/835

[56] References Cited

U.S. PATENT DOCUMENTS

| 2,304,419 | 12/1942 | Pratt | 198/835 |
| 3,999,674 | 12/1976 | Meitl | 241/101.7 X |
| 4,078,733 | 3/1978 | Popiolek | 414/24.6 X |
| 4,195,958 | 4/1980 | Vahlkamp et al. | 414/24.6 |
| 4,266,899 | 5/1981 | Skeem | 414/24.6 |
| 4,360,167 | 11/1982 | Beccalori et al. | 414/24.6 X |
| 4,428,707 | 1/1984 | Cockle et al. | 414/24.6 |
| 4,498,830 | 2/1985 | Seymour et al. | 414/24.6 |

FOREIGN PATENT DOCUMENTS

| 125124 | 11/1984 | European Pat. Off. | 414/24.5 |
| 2522472 | 9/1983 | France | 241/101 A |
| 2048211 | 12/1980 | United Kingdom | 414/24.6 |

Primary Examiner—Leslie J. Paperner
Attorney, Agent, or Firm—Harold H. Dutton, Jr.; George H. Dunsmuir

[57] ABSTRACT

A multi-function bale handling apparatus for use on small trucks or other farm vehicles is defined by a metal frame, which is mounted on the vehicle, a loading device defined by a prong pivotally mounted on the end of an arm, which is also pivotally mounted on the frame for moving a bale from the ground through an arc in excess of 90° to a transversely extending conveyor belt on the frame, a manually operated gate on one side of the frame so that the bale can be discharged in its entirety for storage or feed, and toothed shredder rollers on the other side of the frame for shredding the bale for discharge in particulate form from the apparatus. The loading device is operated by a pair of hydraulic cylinders for rotating the arm and prong. The conveyor and discharge rollers are driven by a common drive including a hydraulic motor, chains and toothed wheels.

1 Claim, 8 Drawing Sheets

ROUND BALE RETRIEVER/FEEDER

BACKGROUND OF THE INVENTION

This invention relates to a bale handling apparatus, and in particular to a round bale retriever and dispense.

There is a large volume of patent literature relating to bale retrieving, conveying, shredding and dispensing apparatuses. In this connection, reference is made to Canadian Patents Nos. 736,936, issued to Sperry Rand Corporation on June 21, 1966; 901,436, issued to M. Newhouse on May 30, 1972; 1,038,338, issued to J. W. Ostrander on Sept. 12, 1978; 1,039,222, issued to Hi-Speed Checkweigher Co., Inc. on Sept. 2, 1978; 1,063,559, issued to DewEze Mfg., Inc. on Oct. 2, 1979; 1,063,979, issued to G. McCullough on Oct. 9, 1979; 1,065,809, issued to R. A. Cos on Nov. 6, 1979 and 1,108,095, issued to Four Star, Inc. on Sept. 1, 1981, and U.S. Pat. Nos. 4,053,071, issued to Hesston Corporation on Oct. 11, 1977; 4,083,501, issued to Blair Manufacturing Company Apr. 11, 1978; 4,090,624, issued to V. R. Krein et al on May 23, 1978; 4,094,427 and 4,094,428 both issued to Hesston Corporation on June 13, 1978; 4,148,399, issued to J. L. Carter et al on Apr. 10, 1979; 4,266,899, issued to W. B. Skeem on May 12, 1981; 4,298,301, issued to J. L. Carter et al on Nov. 3, 1981; 4,306,825, issued to S. Yilit on Dec. 22, 1981; 4,325,666, issued to F. O. Chain et al on Apr. 12, 1982; 4,360,167, issued to F. Beccalori et al on Nov. 23, 1982; 4,364,701, issued to B. R. Lynch et al on Dec. 21, 1982 and 4,376,607, issued to D. W. Gibson on Mar. 15, 1983.

It will be noted that the patents listed above describe a variety of devices for performing one or more functions, namely the retrieving, conveying, shredding and-/or dispensing of hay bales. However, none of the patents describes a single apparatus for effectively carrying out several common operations such as retrieving or picking up a hay bale, transporting the bale to another location, and shredding and discharging the bale for animal feed.

Accordingly, in spite of the large volume of art in the field, there still exists a need for a simple, efficient apparatus for retrieving and dispensing round hay bales. More specifically, there exists a need for such an apparatus which can readily be mounted on new or existing farm vehicles. The object of the present invention is to meet such need.

SUMMARY OF THE INVENTION

Accordingly, the present invention relates to a round bale retrieving and dispensing apparatus comprising frame means for mounting on a vehicle; conveyor means in said frame means for carrying a round bale; loading means on one end of said frame means for picking up and loading a bale onto said conveyor means; shredder means on one side of said frame means for synchronous operation with said conveyor means to shred a round bale for discharge from the apparatus by the conveyor means; discharge means on the other side of said frame means for permitting the discharge of an entire bale by the conveyor means; and drive means for operating said conveyor means, loading means and shredder means.

BRIEF DESCRIPTION OF THE DRAWINGS

The invention will now be described in greater detail with reference to the accompanying drawings, which illustrate a preferred embodiment of the invention, and wherein.

DESCRIPTION OF THE PREFERRED EMBODIMENT(S)

With reference to the drawings, the apparatus of the present invention is intended for use on a small truck 1. The basic elements of the apparatus include a bottom frame (FIGS. 3 to 6) generally indicated at 2, a top frame generally indicated at 3, a bale conveyor 4, stripper or feed rollers 5 and 6, a discharge roller 7 and a bale loading device generally indicated at 8.

Figure 2:
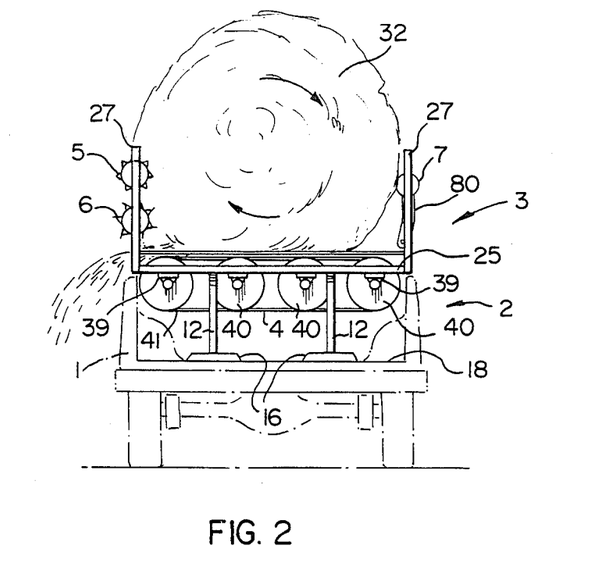
FIG. 2 is a schematic, rear elevation view of the apparatus of FIG. 1 with parts omitted.
Figure 3:
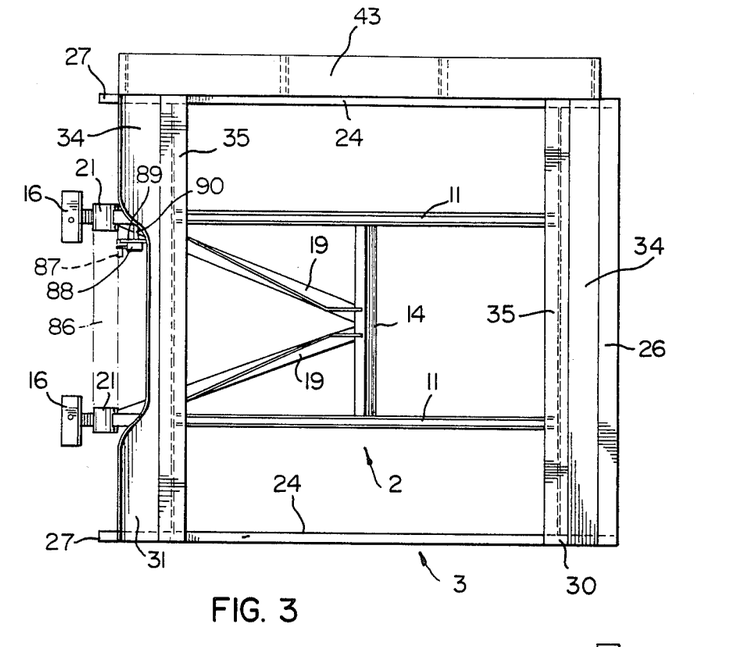
FIG. 3 is a plan view of the main frame of the apparatus of FIGS. 1 and 2.
Figure 4:
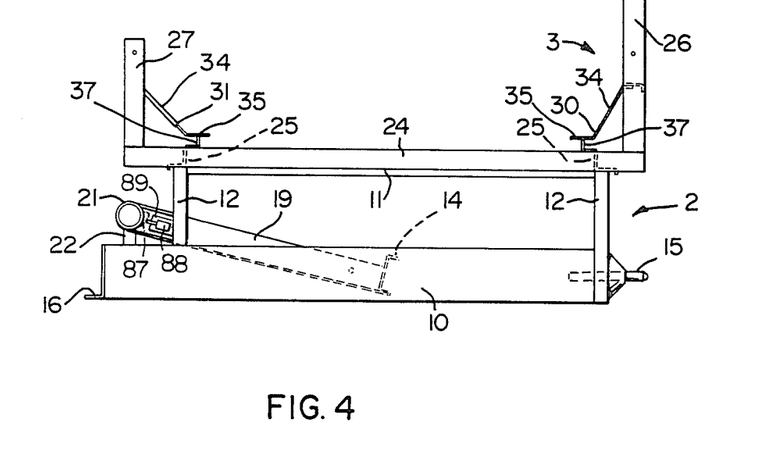
FIG. 4 is a side elevation view of the frame of FIG. 3.
Figure 5:
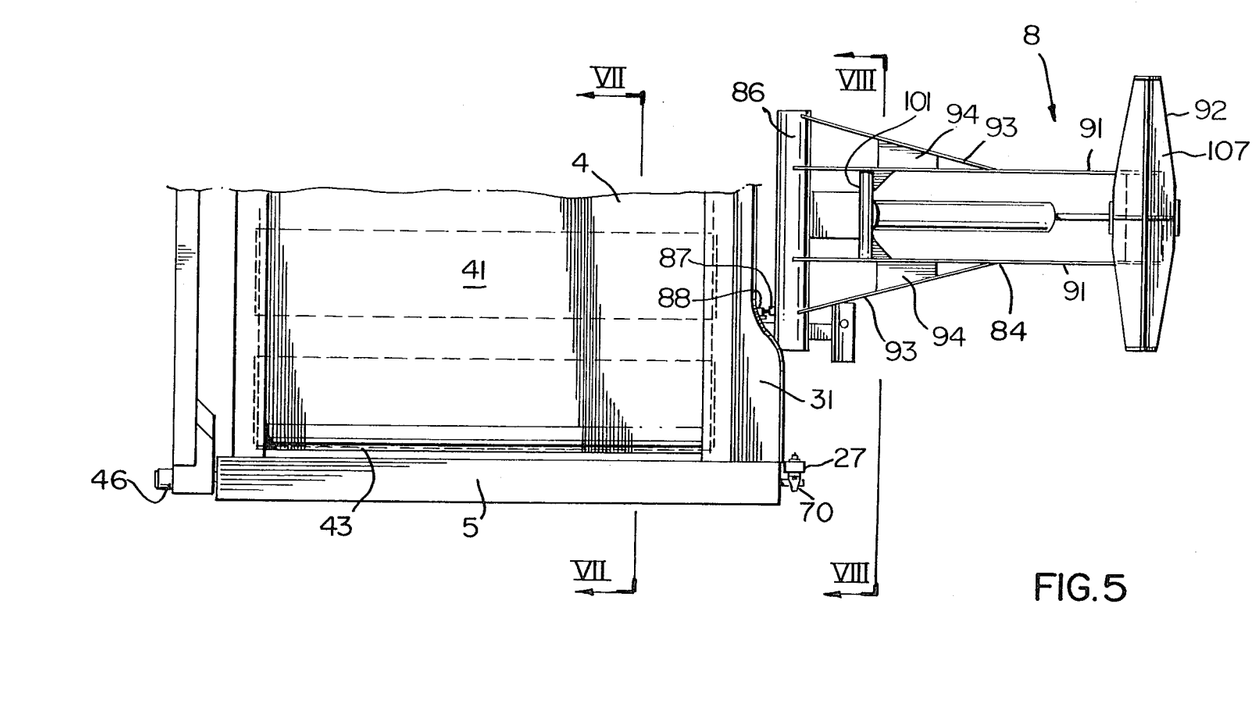
FIG. 5 is a plan view of one side of the apparatus of FIGS. 1 and 2.
Figure 6:
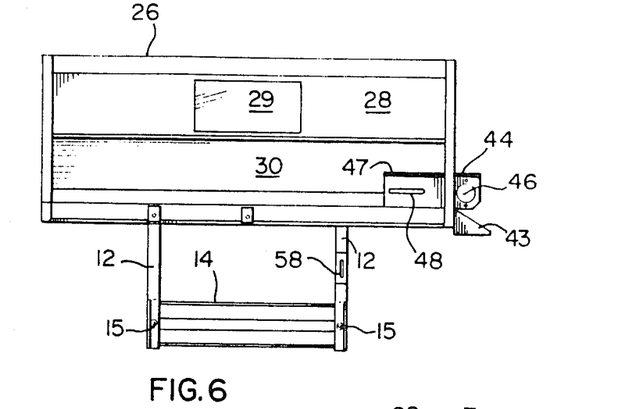
FIG. 6 is a front elevation view of the frame of FIGS. 3 and 4.

The frames 2 and 3 (FIGS. 3, 4 and 6 to 8) are interconnected and carry the remaining elements of the apparatus on the truck 1. The bottom frame 2 is rectangular, and includes longitudinally extending lower side bars 10, upper side bars 11, posts 12 and an inclined central crossbar 14. A pin 15 extends forwardly from the front end of each lower side bar 10 for insertion into a socket (not shown) in the truck 1 for retaining the frame in the truck. An L-shaped plate 16 extends across the rear end of each side bar 10 for securing the bottom frame 2 to the truck floor 18 (FIG. 2). A pair of diagonal braces 19 extend rearwardly and outwardly from the centre of the crossbar 14, with sleeves 21 on the outer end thereof. The sleeves 21 are also supported by posts 22 extending downwardly to the floor 18 of the truck 1.

The top frame 3 is defined by side bars 24, end bars 25, a front wall 26 and rear corner posts 27. The front wall 26 (FIGS. 6 to 8) is defined by a generally rectangular frame, with a metal sheet 28 therein and a window 29, for alignment with the rear window of the truck. An inclined ramp 30 extends downwardly and rearwardly from the bottom end of the sheet 28. The ramp 30, and an inclined ramp 31 on the rear end of the frame 3 prevent longitudinal movement of a round bale 32 (FIGS. 1 and 2) on the apparatus. Each ramp 30 and 31 (FIG. 4) includes a sloping portion 34 and a horizontal bottom portion 35 mounted on a cross-bar 37 extending between the side bars 24.

A plurality of pillow block bearings 39 are mounted on the bottom of the end bars 25 for rotatably supporting the ends of conveyor rollers 40 of the conveyor 4. An endless belt 41 extends around the rollers 40 for supporting the round bale 32. The belt 41 extends beneath the horizonatal portion 35 of the ramps 30 and 31, and beneath the inner edge of a discharge ramp 43 (FIGS. 3 and 5) on one side of the top frame 3 for discharging hay from the bale 32.

Figure 9:
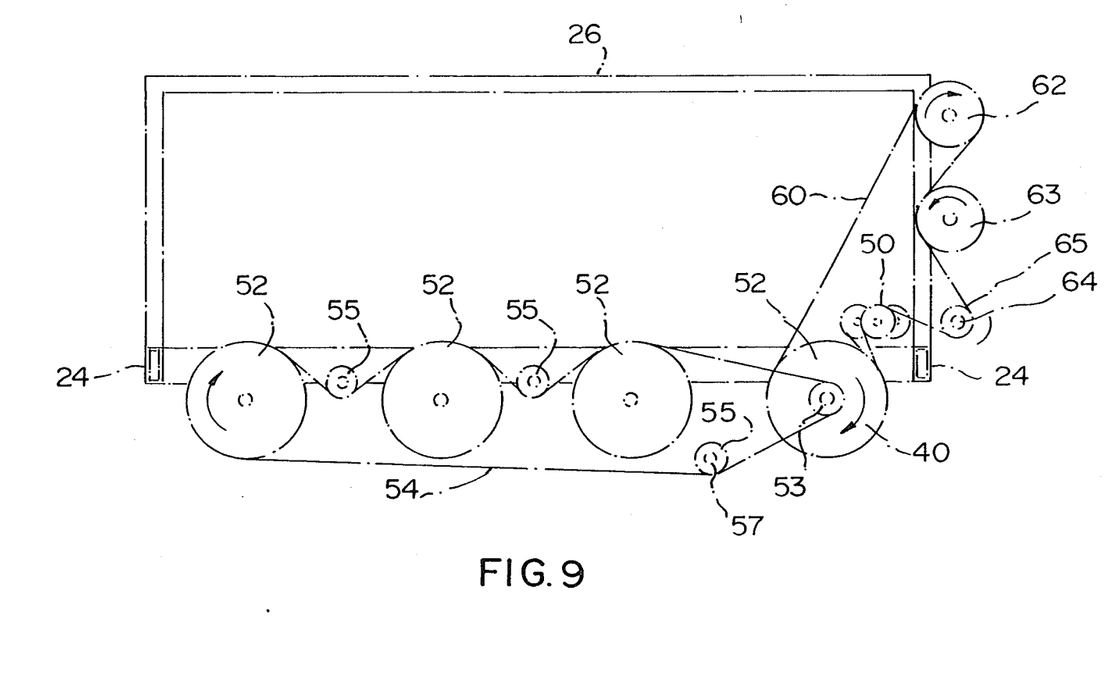
FIG. 9 is a schematic end view of a drive system for use in the apparatus of FIGS. 1 to 8.

A bracket 44 (FIG. 6) extends outwardly from the bottom front edge of the top frame 3 for supporting a reversible hydraulic motor 46. The inner end 47 of the bracket 44 includes a horizontal slot 48 for slidably supporting an idler sprocket wheel 50 (FIG. 9).

DRIVE SYSTEM

Figures 10, 11, 12, 13:
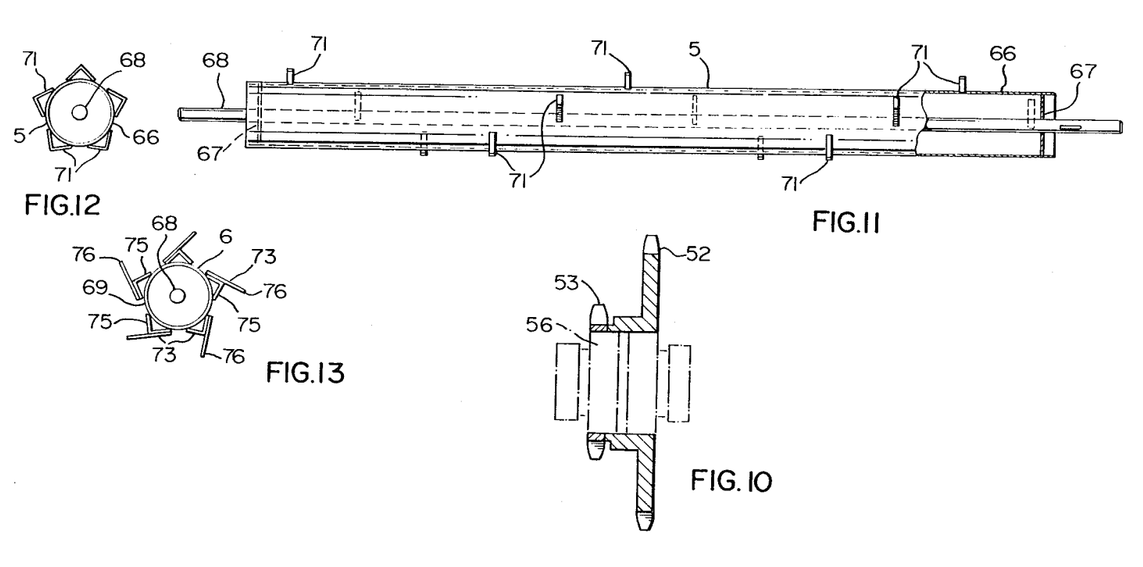
FIG. 10 is a cross-sectional view of a pair of toothed wheels used in the drive system of FIG. 9.
FIG. 11 is a partly sectioned, side elevation view of a feed roller used in the apparatus of FIGS. 1 to 8.
FIG. 12 is an end elevation view of the roller of FIG. 11.
FIG. 13 is an end elevation view of a second feed roller used in the apparatus of FIGS. 1 to 8.

The hydraulic motor 46 and the idler sprocket wheel 50 form part of a drive system for the conveyor 4 and the feed of stripper rollers 5 and 6. The drive system, which is mounted on the front end of the top frame 3 includes toothed wheels 52 and 53 mounted on the front ends of the rollers 40. An endless chain 54 extends around the wheels 52 on three of the rollers 40, around the smaller toothed wheel 53 on the remaining roller 40 and around idler sprocket wheels 55. The toothed wheel 52 on the remaining roller 40 and the toothed wheel 53 are mounted on a common shaft 56 (FIG. 10). The sprocket wheels 55 are mounted in bearings (not shown) on the front end 26 of the top frame 3. The shaft 57 of one of the wheels 55 is slidably mounted in a slot 58 (FIG. 6) on a post 12 at the front of the bottom frame 2 so that the tension on the chain 54 can be adjusted. A second endless chain 60 extends around the remaining toothed wheel 52, and the toothed wheels 62 and 63 on the front ends of the stripper rollers 5 and 6, around a sprocket wheel 64 on the drive shaft 65 of the hydraulic motor 46, and around the idler sprocket wheel 50. Thus, the motor 46 is used to drive all of the rollers 5, 6 and 40 simultaneously, i.e. to drive the conveyor 4 whenever the rollers 5 and 6 are being driven.

FEED ROLLERS

Figure 14:
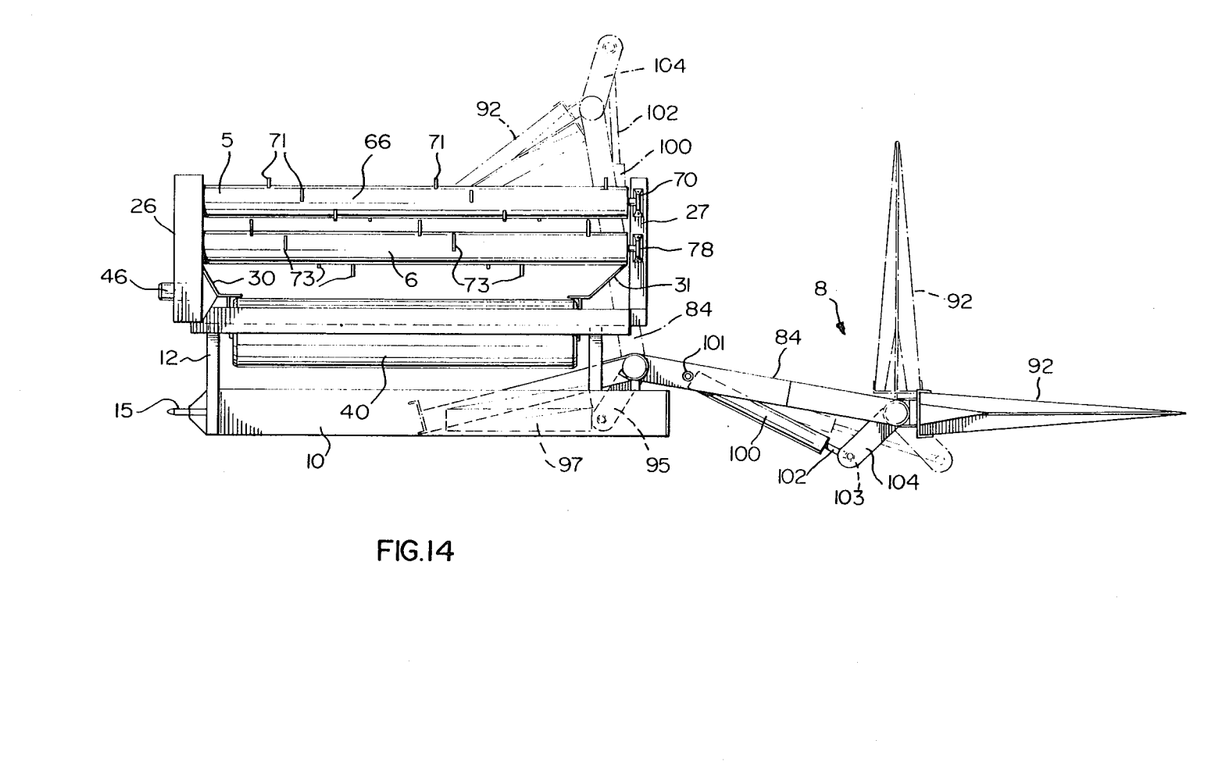
FIG. 14 is a side elevation view of the apparatus of FIGS. 1 to 8.
Figures 15, 16:
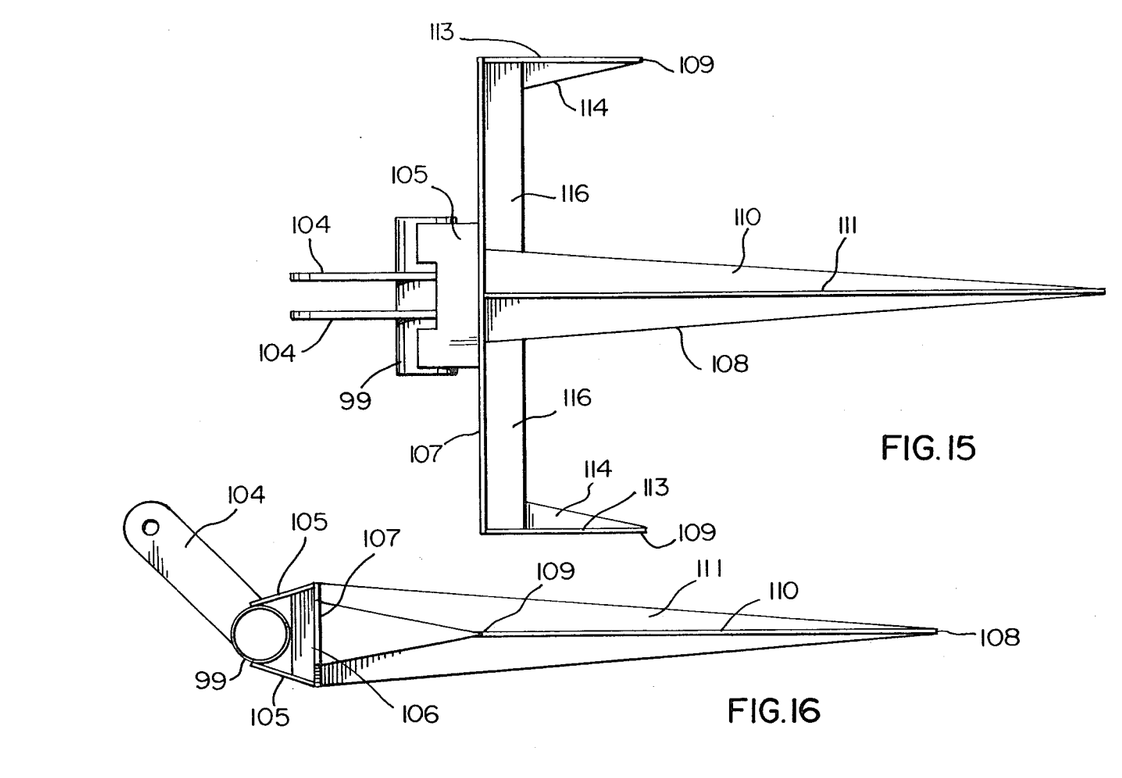
FIG. 15 is a plan view of the prong.
FIG. 16 is a side elevation view of the prong of FIG. 15.

Referring to FIGS. 11 and 12, the roller 5 is defined by a cylindrical casing 66 with recessed ends 67 mounted on a shaft 68. The shaft 68 extends between pillow block bearings 70 (one shown—FIGS. 5, 8 and 14) on the front end 26 and one post 27 of the top frame 3. A plurality of V-shaped metal strips 71 project outwardly from the casing 66. The strips 71 are arranged on the casing 66 to define a helix. The roller 6 (FIG. 3) is identical to the roller 5, except that the strips 71 are replaced by projections 73 including V-shaped bases 75 and strips 76 attached to and extending outwardly from one arm of each base 75. The shaft 68 of the roller 6 is mounted in bearings 78 (one shown) on the front end 26 and the post 27 of the top frame 3.

DISCHARGE ROLLER

Figure 1:
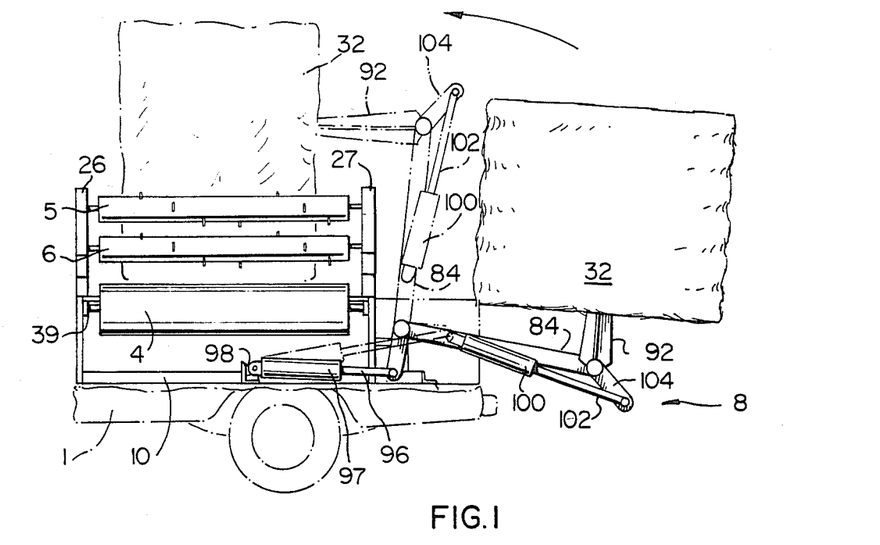
FIG. 1 is a schematic, side elevation veiw of a round bale handling apparatus in accordance with the present invention mounted on a truck.
Figure 7:
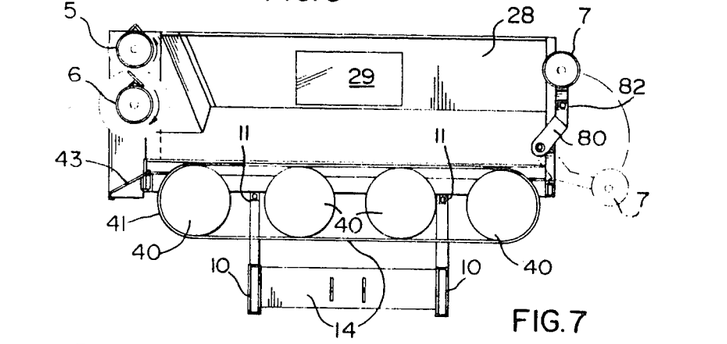
FIG. 7 is a cross section taken generally along line VII—VII of FIG. 5.
Figure 8:
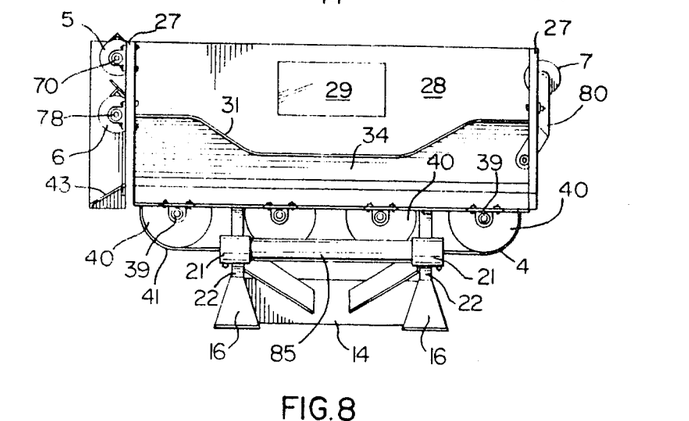
FIG. 8 is a cross section taken generally along line VIII—VIII of FIG. 5.

With reference to FIGS. 1, 7 and 8, a gate defined by the discharge roller 7 is provided on the side of the top frame 3 opposite to the rollers 5 and 6. The roller 7 extends between the ends of the top frame 3, and is rotatably mounted on the outer ends of arms 80 (one shown). The inner ends of the arms 80 are pivotally connected to the frame end 26 and the post 27. A reinforcing bar 82 extends between the arms 80, for increasing the stability of the gate. The gate can be opened manually to discharge the hay bale 32 from the apparatus.

LOADING DEVICE

A bale 32 of hay is loaded onto the conveyor 4 by means of the loading device 8. As shown in FIGS. 1, 5, and 14 to 16 the loading device 8 includes an arm 84 defined by a frame pivotally mounted on an axle 85 (FIG. 8) extending between the sleeves 21. For such purposes, the arm 84 includes a traversely extending tube 86, (FIG. 5), which is placed over the axle 85. An arcuate cam 87 (FIGS. 3 to 5) is provided on the tube 86 for opening and closing a microswitch 88 mounted on a plate 89. The plate 89 is supported by a rod 90 extending outwardly from one of the braces 19. A pair of arms 91 extend rearwardly from the tube 86, with a prong 92 at their outermost end. The arm 84 is reinforced by diagonal braces 93 extending between the tube 86 and the arms 91, and by plates 94. A pair of parallel arms 95 (one shown) extend downwardly from near the centre of the tube 86, and are connected at their outer ends to the outer end of a piston rod 96 (FIG. 1). The piston rod 96 extends into one end of a hydraulic cylinder 97, the other end of which is pivotally connected to a strip 98 of angle iron on the floor of the truck 1. By extending or retracting the piston rod 96, the arm 84 can be caused to rotate around the axle 85.

The prong 92 includes a sleeve 99 at one end which is rotatably mounted on stub axles (not shown) on the outer ends of the arms 91. The prong 92 is rotated around a horizontal axis by a hydraulic cylinder 100 one end of which is rotatably mounted on an axle 101 extending between the arms 91. A piston rod 102 extends out of the cylinder 100 and is pivotally connected to a pin 103 extending between the outer ends of a pair of arms 104. The arms 104 are rigidly connected to the sleeve 99. Thus extension or retraction of the piston rod 102 causes rotation of the prong 92 around the axis of the sleeve 99.

Plates 105 and 106 connect the sleeve to a cross-bar 107, which supports three tines 108 and 109. The long central tine 108, which is cruciform in cross section, is defined by outwardly tapering plates 110 and 111. The short tines 109 are defined by triangular side plates 113 and gussets 114. The innter ends of the gussets 114 are welded to reinforcing crossbars 116, which extend between the side plates 113 and the central tine 108.

OPERATION

In operation, with the prong 92 in the extended position (solid lines in FIG. 14), the truck 1 is driven in reverse until the prong 89 penetrates a hay bale 32. The piston rod 102 is then extended to rotate the arms 104 and the remainder of the prong 92 to the vertical position (solid lines in FIG. 1 and phantom outline in FIG. 14). The piston rod 96 is extended to cause the arm 84 to rotate around the axle 85 to the elevated positions (phantom outline in FIG. 1) where the hay bale 32 is located over the conveyor 4. When the prong 92 passes over centre, it drops, so that the bale 32 is dropped onto the conveyor 4. In order to cause the prong 92 to drop, the microswitch 88 is actuated by the cam 87. The microswitch 88 deactivates the cylinder 97 to place the prong 92 in the float condition during the last 30° of the 115° of travel thereof. The bale 32 can then be removed. When the sleeve 86 is rotated to return the arm 84 to the lower position, the switch 88 is opened.

The bale 32 is carried on the conveyor 4 to a storage or use position. If it is desired to discharge the complete bale 32 from the vehicle at a feed yard or a storage area, the gate defined by the discharge roll 7 is lowered manually to the discharge position (phantom outline in FIG. 7) and the hydraulic motor 46 is started to drive the conveyor 4 in the appropriate direction (clockwise when viewed from the rear of the vehicle). If the bale 32 is being dispensed for feeding purposes, the discharge roll 7 is retained in the elevated, transport position (FIG. 2), and the hydraulic motor 46 is started to cause the conveyor 4 to move in the appropriate direction (counterclockwise when viewed from the rear of the vehicle) and to rotate the rollers 5 and 6. The teeth 71 and 73 on the rollers 5 and 6 rotate in opposite directions (FIG. 7) to shred the hay at the surface of the bale 32 while the latter is being rotated and moved towards the rollers 5 and 6 by the conveyor 4. The shredded hay is discharged from one side of the conveyor 4 over the plate 43 while the truck 1 is driven at a speed dictated by the quantity of feed to be deposited over a given area.

What I claim is:

1. A round bale retrieving and dispensing apparatus comprising frame means for mounting on a vehicle; conveyor means including loading means in said frame means for picking up and loading a bale onto said conveyor means; said loading means including prong means pivotal on said one end of said frame means; a bale penetrating tine pivotal on said arm means; first piston and cylinder means for rotating said arm means with respect to said frame means; second piston and cylinder means for rotating said tine with respect to said arm means around a horizontal axis between a bale penetrating position and a bale loading position over said conveyor means; shredder means on one side of said frame means for synchronous operation with said conveyor means to shred a round bale for discharge from the apparatus by the conveyor means; discharge means on the other side of said frame means for permitting the discharge of an entire bale by the conveyor means; and drive means for operating said conveyor means, loading means and shredder means, and including switch means for actuation by said arm means, whereby said prong means is in a free floating condition when in the bale loading position.

* * * * *